(12) United States Patent
Hill

(10) Patent No.: US 6,745,699 B2
(45) Date of Patent: Jun. 8, 2004

(54) MATERIAL HANDLING TURNTABLE

(76) Inventor: Reinier Hill, 131 Brockley Dr., Hamilton (CA), L8E 3C4

(*) Notice: Subject to any disclaimer, the term of this patent is extended or adjusted under 35 U.S.C. 154(b) by 0 days.

(21) Appl. No.: 10/242,786

(22) Filed: Sep. 13, 2002

(65) Prior Publication Data

US 2003/0056682 A1 Mar. 27, 2003

Related U.S. Application Data

(60) Provisional application No. 60/324,930, filed on Sep. 27, 2001.

(51) Int. Cl.[7] ................................................ B60S 13/02
(52) U.S. Cl. ............................. 104/35; 105/28; 414/28
(58) Field of Search ........................ 104/35, 45, 46, 104/44, 39, 36; 105/28; 198/465.1, 465.2, 465.4; 414/228, 223

(56) References Cited

U.S. PATENT DOCUMENTS

| 3,948,165 A | * | 4/1976 | Seifert | 100/116 |
|---|---|---|---|---|
| 4,301,929 A | * | 11/1981 | Fitzgerald et al. | 209/608 |
| 4,621,782 A | * | 11/1986 | Carlson et al. | 248/183.3 |
| 4,917,021 A | * | 4/1990 | Murphy | 105/378 |
| 5,400,550 A | * | 3/1995 | Beasley | 52/65 |
| 5,755,160 A | * | 5/1998 | Blufordcraving | 104/36 |
| 5,782,602 A | * | 7/1998 | Mehta et al. | 414/672 |
| 6,196,048 B1 | * | 3/2001 | Kunimi | 73/1.38 |

* cited by examiner

Primary Examiner—Frantz F. Jules

(57) ABSTRACT

A material handling turntable includes a turntable including a top for receiving a load thereon and also a bottom. The turntable further includes a motor and gear set for driving said turntable in circular motion and also includes a low friction disc slidably receiving said bottom of said turntable thereon. Preferably the turntable is assembled from multiple pie sections fastened to each other wherein each pie section including a lattice work type frame with the bottom of each frame member defining a bottom load bearing surfaces making sliding contact with said low friction disc.

18 Claims, 5 Drawing Sheets

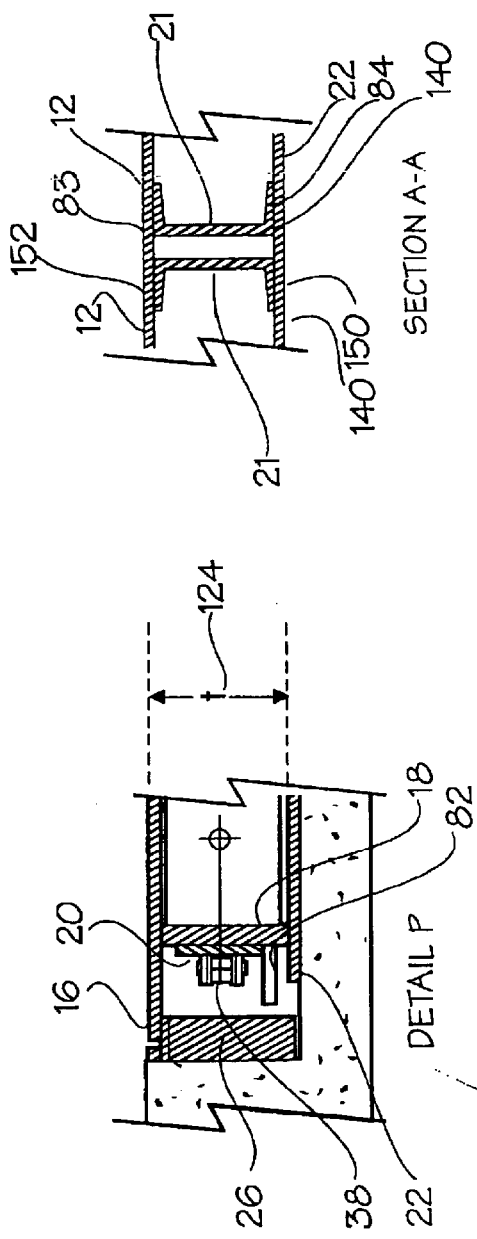
FIG. 2
FIG. 3
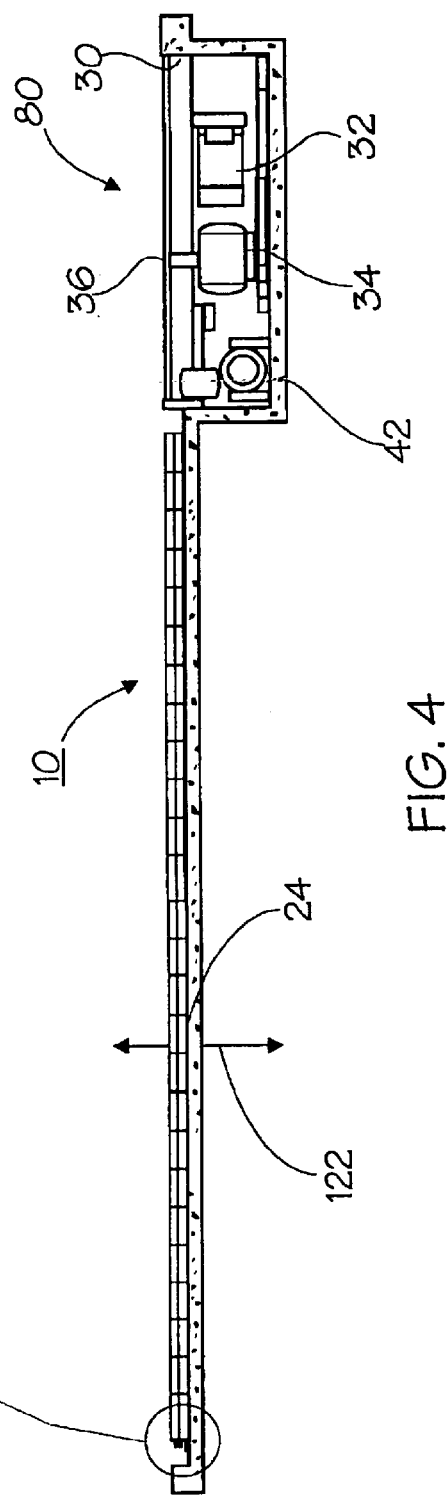
FIG. 4

MATERIAL HANDLING TURNTABLE

This application claims the benefit of Provisional Application No. 60/324,930, filed Sep. 27, 2001.

FIELD OF THE INVENTION

This invention relates to material handling equipment. It has been developed specifically for the automobile industry for handling parts on a mass production line. However; from what follows, it will be apparent that this has applications in other production areas and is not limited to the production of automobiles or other motor vehicles.

BACKGROUND OF THE INVENTION

On a production line, such as an automobile parts production line, parts, such as doors, trunk lids, hoods, body panels, etc., are stamped form sheet metal at a press and are produced at the rate, currently, of eight to twenty five per minute. The handling of these parts on the line is largely automated but at the end of the line, the parts are removed manually by crews of workers. The parts are moved into a rack that is mounted on a riser. Usually the parts are placed vertically in slots in a rack and thereafter are moved to a storage location; usually by a fork lift truck for storage before further processing and assembly.

The standard procedure is to provide a table onto which the stamped parts discharge from a conveyor. As the parts arrive at the table they are manually removed then placed in a rack. When a rack is filled, it is moved to a location from which it can be carried by forklift to storage.

Commonly the racks are placed on turntables at the end of the press line. The turntable can rotate from the loading position to an unloading position at which they are picked up by forklift to be moved to a temporary storage location. Thereafter the turntable is rotated to a position at which empty racks can be positioned and then the table is turned to the loading position once more to repeat the cycle.

Currently the turntables are supported by air bearings and are moved to the load, unload and reload rack positions by a mechanical drive. The riser mechanism can be adjusted for height to accommodate the ergonomic requirements of the crew and the geometry of the parts of the plan, but the loads placed on the conveyor are ones, which involve significant and taxing physical effort. While with the air bearing arrangement the loads once moving require little effort but to start these loads and to stop them with accuracy is demanding and inaccurate. Thus it is proposed that the table be mechanically rotated giving accuracy of position and increased speed. The most attractive proposition was using an air motor to assist in turning the table simply because air is abundant and compressors are commonly involved in production line processes. However, simply because compressed air is available, it is not abundant and cheap. Vast amounts are needed to inflate air bearings underneath the bulk of a large table and its load. These applications did not achieve higher index speed and are too expensive to operate and maintain.

In order to achieve enough rigidity for turntables supported on air bearings, it is necessary to have a fairly massive structure to tolerate the vertical loading and achieve smooth operation of the turntable. The rigidity and strength requirements results in turntables being considerably heavier than the present invention. The large mass associated with turntables riding on air bearings results in high inertia conditions that require large amounts of horse power in order to accelerate and decelerate the table to a preselected position.

In addition, in order to provide for the rigidity and strength that is necessary, the tables tend to be very thick which usually means that the turntable is mounted above the normal floor level. Therefore tow motors and/or tractors cannot simply drive onto the turntable, but must take precautions to ensure that any moving vehicles do not bump into the elevated turntable and that the load is carefully placed onto the turntable from a distal position.

It is common to have two or even more turntables receive from a production line with a crew to each turntable. The receiving table being a hexagonal outline with a base receiving from the line, two adjacent sides defining paths to two turntables, two sides facing the turntables and aside opposite the base side which could, conceivably, accommodate a third turntable. The conditions clearly are crowded and, shared by a crew and forklifts are fraught with risk.

The turntables are usually elevated and risers are positioned on them to hold the racks so that the turntables are occupying spaces, which are dedicated to them and are useless for other purposes. To this state of the art comes the inventor/engineer with a dramatic new proposal.

The inventor proposes a new turntable one or more of which can be placed at the end or intermediate location of a production line and which can be moved between a load, unload and reload positions with precision and can be moved to intermediate positions between the load and unload positions to accommodate a crew requirement with precision and safety. To achieve this the inventor uses a disc depending on a central bearing and housed within a peripheral curbing and drive comprising a motor, a drive gear, a chain, or other flexible element trained around a drive gear and the periphery of the disc. The disc has a generally flat top surface and has an annular flange at or adjacent to its periphery about which the chain is trained. The disc and flange together have a height equal to the thickness of the floor finishing layer so that by removal of that layer to expose the sub flooring the, disc can be located with its top surface flush with the surrounding floor. This provides significant safety advantages over existing arrangements and it permits the space the disc occupies to be used for multiple purposes.

With such an arrangement it becomes necessary only to excavate sub floor in a small region to accommodate the drive mechanism.

It is desirable to have a turntable which has low total mass which results in a low total inertia which results in a turntable requiring much less power to accelerate and decelerate efficiently and accurately. Additionally such a turntable has a much lower profile and/or overall thickness resulting in a turntable which in most cases can be mounted flush to the existing floor line due to the shallower profile.

SUMMARY OF THE INVENTION

The present invention a material handling turntable comprises:

a) a turntable including a top for receiving a load thereon and a bottom;

b) a means for driving said turntable in circular motion;

c) a bearing means for supporting vertical loading on said turntable operably adapted to slidably interact with said bottom of said turntable.

Preferably wherein said bearing means includes a low friction disc slidably receiving said bottom of said turntable thereon.

Preferably wherein said turntable assembled from multiple pie sections fastened to each other.

Preferably wherein each pie section including a lattice work type frame with the bottom of each frame member defining a bottom load bearing surfaces making sliding contact with said bearing means.

Preferably wherein each frame member including U shaped steel beams laid on their side with one leg of the U shaped channel defining the load bearing surfaces at the bottom.

Preferably wherein each pie section attached to a central hub at one end and to adjacent pie sections at the other broad end.

Preferably wherein each pie section is attached with one locating pin to the central hub and with one fastener at each side of the broad end of the pie to each adjacent pie section.

Preferably wherein each pie section fixed in place at three attachment points.

Preferably wherein said drive means including a chain trained around the outer periphery of said turntable which is driven by a sprocket to rotate said table.

Preferably wherein said chain is trained onto a frictional element located on the outer periphery of said turntable for holding said chain in place and imparting rotational forces.

Preferably wherein said low friction disc comprised of ultra high molecular weight polyethylene pad.

Preferably wherein said top including top plates providing for a substantially level loading surface.

Preferably wherein the number and size of pie sections is selected for ease of transportation on a flatbed trailer.

Preferably wherein said drive means including control means for controlling the rotation and positioning accuracy of said turntable.

Preferably wherein said drive means including a feed back drive system with servo motors.

Preferably wherein the turntable including a central precision bearing for supporting any radial forces.

BRIEF DESCRIPTION OF THE DRAWINGS

FIG. 2 is a vertical section through the peripheral region of the turntable taken at detail P in FIG. 4.

FIG. 3 a section on line AA of FIG. 1.

FIG. 4 is a vertical section through the axis of the turntable.

DETAILED DESCRIPTION OF THE PREFERRED EMBODIMENT

Figure 1:
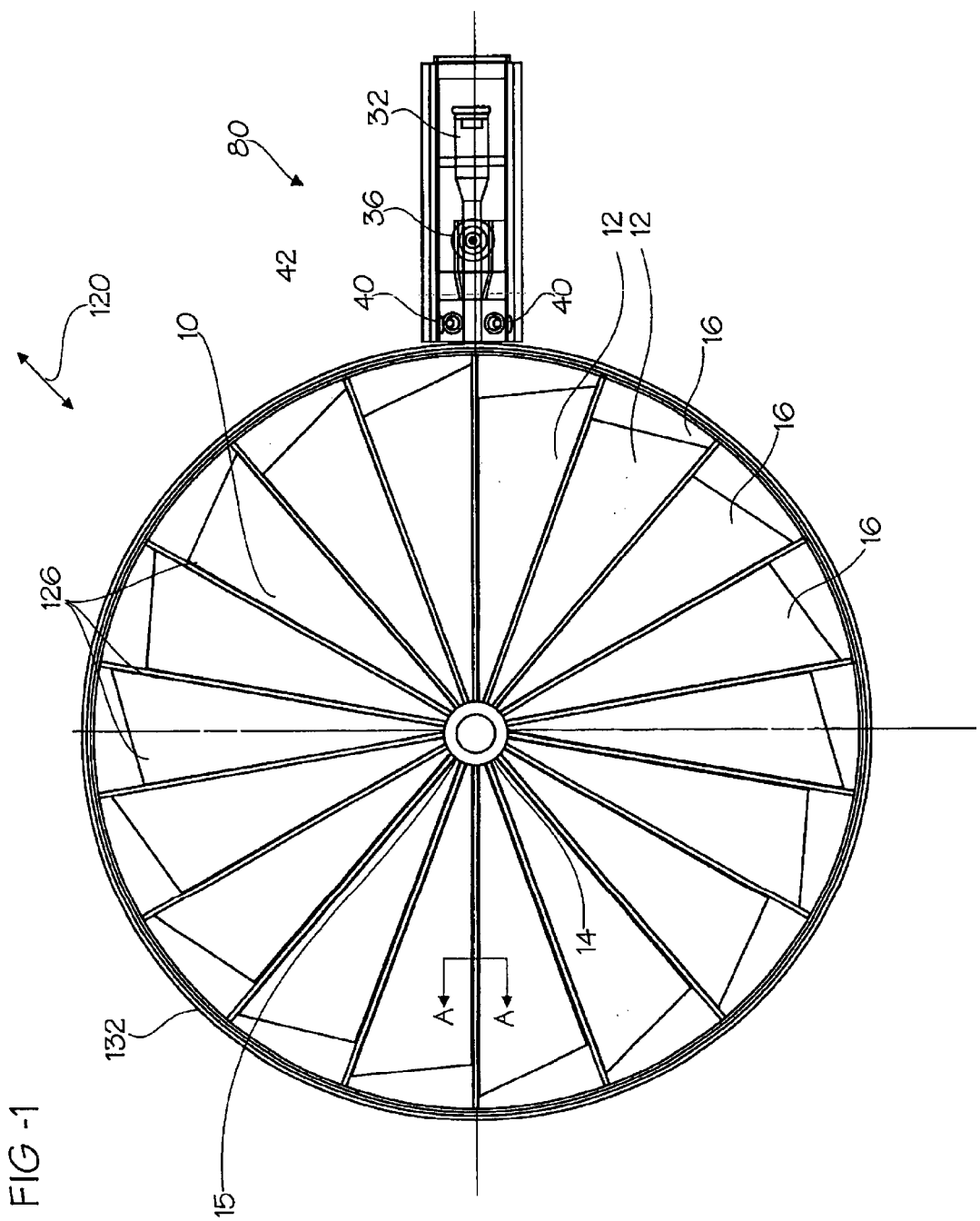
FIG. 1 is a top plan view of the turntable.

The turntable, generally indicated at 10 is made up of a plurality of triangular plates 12 radiating form a central, circular bearing cover 14. Secured at the outer edge of each plate are removable inspection/maintenance plates 16 having part circular outer edges, which complete the turntable disc.

As can be seen in FIG. 2, detail P in FIG. 4, the turntable has peripheral, downwardly depending flange 18 having a high friction drive surface element 20 about which, as described herein after, the drive chain 38 is trained. As seen in FIG. 3 the radial edges of the plates 12 have C-sectioned connector/reinforcement frame elements 21 which are bolted together at spaced intervals to form a unitary turntable. The lower flanges of the C-section elements ride on a low-friction disc 22.

The turntable is radially loaded by a large diameter precision bearing 24 to which access can be had through removable cover 14. At its outer periphery the turntable top is overlapping a curbing ring 26 to form a labyrinth to keep out dirt and also for obvious safety reasons.

The total height of the turntable and disc 22 is, where feasible, selected to be equal to the thickness of the top layer of the flooring so that once only the top floor is removed; the turntable assembly can be installed to be flush with the surrounding floor.

It is necessary to excavate the sub floor at 30 to accommodate a motor 32. The motor, through a gear box 34 drives a sprocket 36 about which drive chain 38 is trained. The chain extends fully about flange 18 of the turntable and passes between chain tensioning snub sprockets 40. The snub sprockets are mounted on a moving arm and provide chain tension by an air pressure device 42.

In the alternative the snub sprockets are stationary and the drive base is sliding to provide chain tension by means of an air pressure device 42.

In operation the motor turns to cause the turntable to be rotary indexed through a divisible portion of a circle at which an appropriate component receiving container and/or rack is placed. The motor than advances the turntable with the container and/or rack through a further index. To bring the container and/or rack to a loading position adjacent to the end of a production line at which the components of the line are placed into the container and/or rack after another index the loaded container and/or rack can be removed and the container and/or rack with the components taken to a temporary storage area.

As noted above, the turntable has been designed for use with an automobile production line but it will be apparent that it is not limited to that application.

Referring now to FIG. 1, the turntable shown generally as 10 is shown constructed of 18 roughly equally sized pie sections 126. The radial direction 120 of turntable 10 is shown in FIG. 1 and radial forces which are imparted upon turntable 10 are accommodated by a precision bearing 24 which is shown in FIG. 4.

The turntable is rotated via a drive chain 38 which is mounted around the outer periphery 132 of the pie sections 126 of turntable 10 and is driven by a drive assembly 80.

Referring now to FIGS. 2, 3 and 4, one can see that the turntable 10 is mounted flush with the surrounding flooring and has a very small profile or thickness shown as t in FIG. 2 as 124. The entire thickness 124 is comprised of top plate 12, the thickness of C-section frame elements 21 and as well the thickness of low friction disc 22. Therefore, the entire vertical profile and/or thickness of the turntable 10 depends upon the thickness of top plates 12, the thickness or the profile of C-section frame elements 21 and the thickness of low friction disc 22. The mechanical structure of the present invention can provide for much thinner thickness t 124 compared to prior art devices as will be explained below.

Referring now to FIG. 4, the drive assembly 80 includes a motor 32 gear box 34, a main gear or sprocket 36 for driving drive chain 38 and a tensioning system air pressure devices 42 which in practice are preferably air bags for applying tension to chain 38 via a set of snub sprockets 40. It is possible that the entire gear box/motor arrangement be designed to slide back and forth on a set of rails and/or bearings in order to maintain tension on drive chain 38. Drive chain 38 is trained around the entire outer periphery 132 of turntable 10 and is mounted onto surface elements 20 which in practice are rubber belting compounds and/or rubber pieces to maintain friction between drive chain 38 and the surface element 20. Chain 38 then trains through drive assembly 80 which imparts rotational forces onto turntable 10 and also maintains a predetermined amount of tension on drive chain 38.

One will note that the drive assembly 80 requires deeper excavation than the balance of turntable 10 in order to accommodate the larger components, namely the motor 32, gear box 34, and the tensioning mechanism.

FIG. 2 shows the details of the outer periphery 132 of turntable 10. Removable inspection plates 16 overlap with a curbing ring 26 and in practise there is a small gap, although not seen in the diagrams between the removable inspection plate 16 and the curbing ring 26. An overlap is present to ensure that there is a minimum amount of debris entering into the cavity below where the turntable is mounted.

Figure 6:
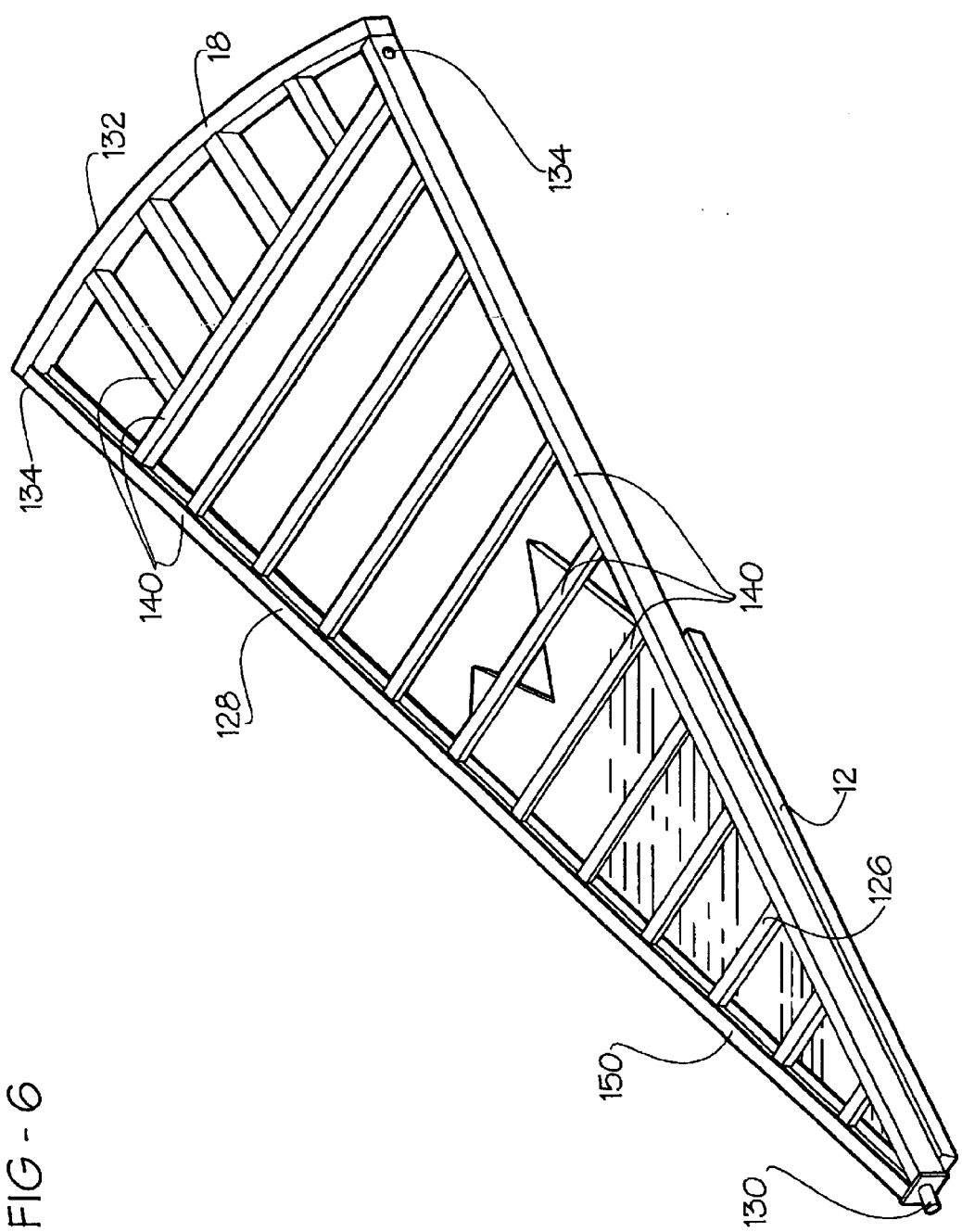
FIG. 6 is a schematic perspective view of a single pie section of the turntable showing the frame components and the general construction together with the top plate of a single pie section of the turntable.
Figure 7:
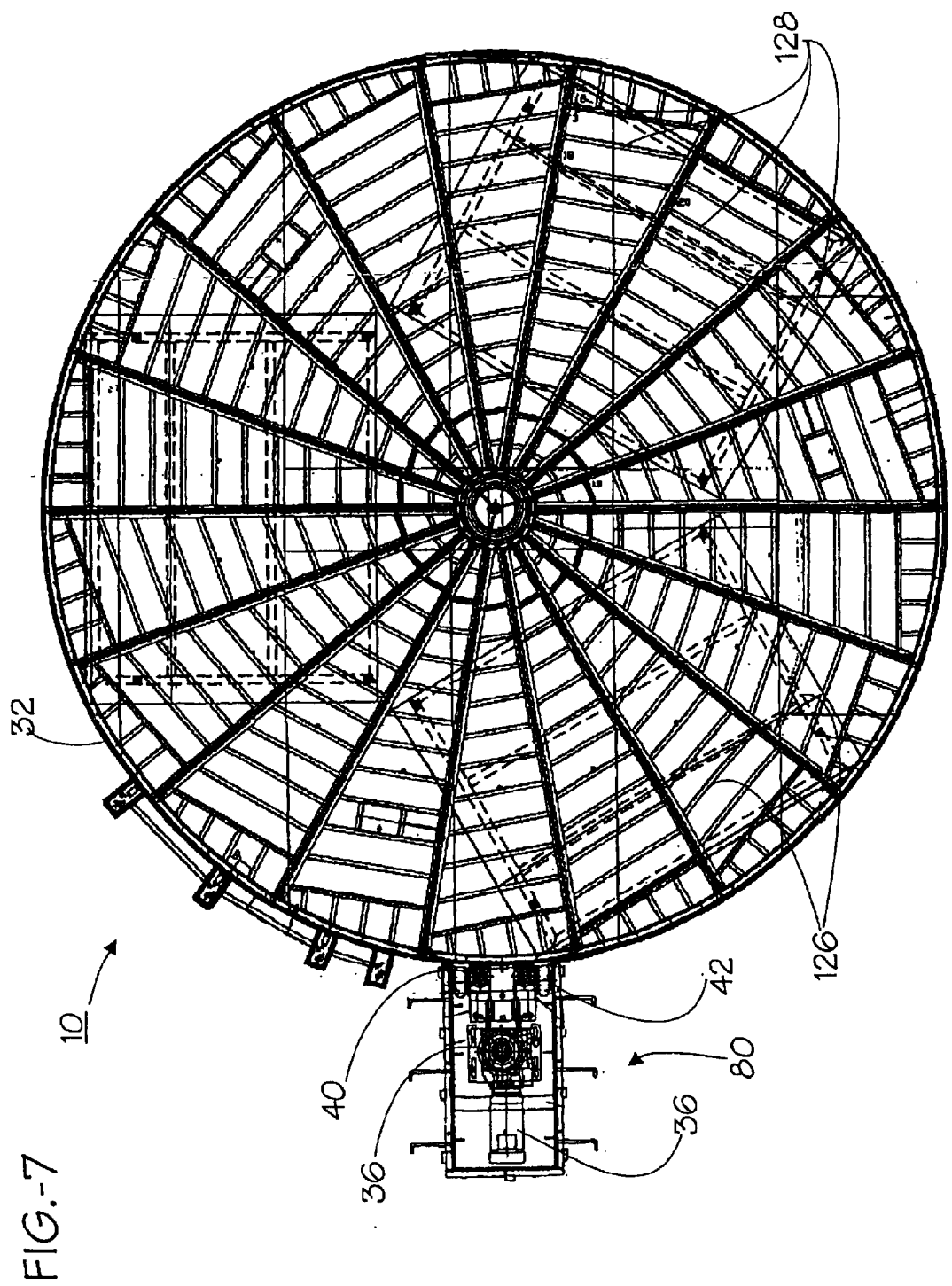
FIG. 7 is a top plan view of the turntable with the top plates removed showing the frame structure.

Referring now to FIG. 6 depicting a single pie section 126 inverted in order to show the bottom load bearing surfaces 140 which are essentially the bottom portion 84 of C-section frame elements 21. The bottom 150 of each pie section 126 is comprised of a lattice of C-section frame elements 21 which are welded or by other means joined together to form frame 128 which is a semi flexible contiguous frame component. On the narrow end of pie section 126 is a locating pin 130 which is inserted into a central hub 15 which is mounted onto large diameter precision bearing 24. Pie section 126 is further attached at the broad end on each side via attachment hole 134 in order to securely fasten pie section 126 to each adjacent pie section on the left and right hand side. Assembling and joining pie sections 126 in this manner, those skilled in the art will see that individual pie sections 126 are more or less free floating in nature in that they are attached to a central hub 15 at one end via a locating pin 130 and are fastened with fasteners 136 to attach the distal outer ends of each pie section to another. Between locating pin 130 and the outer periphery 132 there is no further attachment of one pie section 126 to the adjacent pie section 126 and therefore there is a great deal of freedom of movement and flexibility of each pie section 126 as it rotates as part of turntable 10.

Furthermore, a person skilled in the art will see that a great deal of rigidity is not required for frame 128 in that the load is evenly distributed along the load bearing surfaces 140 which in fact are all the bottom portions 84 of the C-section frame elements 21 which make contact with low friction disc 22 as turntable 10 rotates.

Prior art devices utilizing air bearings usually are much thicker than the present device for the same load carrying ability. Turntable 10 can easily be manufactured with much less total thickness due to the use of the low friction disc 22 and the lattice frame structure 128 as shown in FIG. 6 along with the minimal attachment points.

Figure 5:
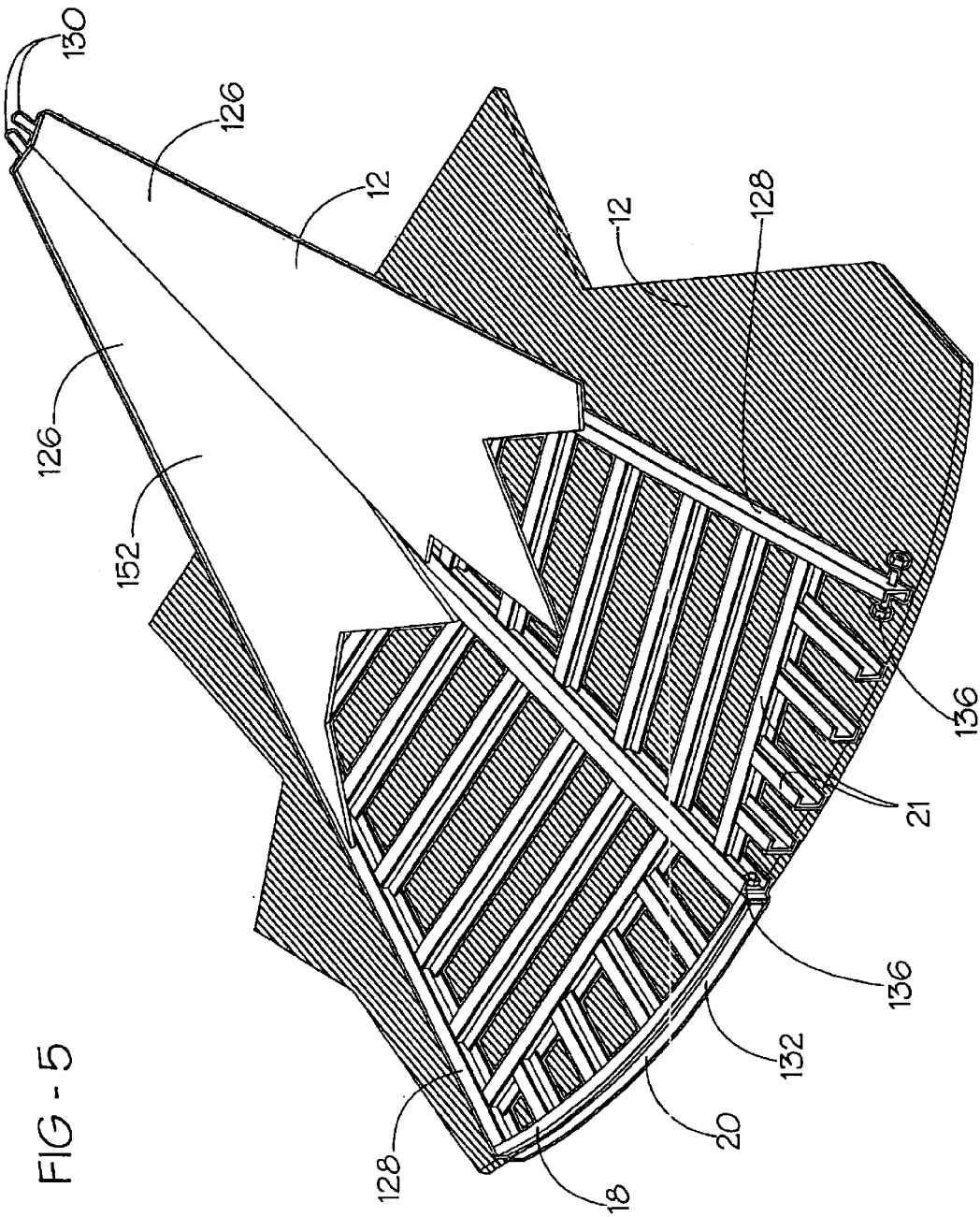
FIG. 5 is a schematic partial cut away view of two pie sections of the turntable shown sliding along a low friction disc.

Referring now to FIG. 5 which shows two upright pie sections 126 mounted side by side. First of all the pie sections are mounted via locating pins 130 onto a central hub 15 which is mounted onto the large diameter precision bearing 24. At the other end pie sections 126 are fastened together using fasteners 136, one at each corner of the broad end of the pie sections 126. FIG. 5 depicts pie sections 126 from the top 152 rather than from the bottom 150 as shown in FIG. 6. Each pie section 126 has top plates 12 mounted thereon in order to provide a secure platform. Not shown in FIG. 5 the top is also covered with removable inspection plates 16 proximate the broad end which can be used for maintenance procedures such as replacing and repairing chain 38. Top plates 12 are mounted onto the top portion 83 of C-section frame elements 21, whereas the bottom portions 84 of C-section frame elements are acting as bearing surfaces riding on low friction disc 22. At the outer periphery 132 of each pie section 126 is flange 18 and thereon is mounted a surface element 20 which is normally a rubber type material for receiving drive chain 38.

Referring to FIG. 2 a service flange 82 is also optionally mounted onto flange 18 in order to provide for servicing of the chain when not in a tensioned condition.

A person skilled in the art will see that the drawings indicate that this turntable is made in 18 equally dimensioned pie sections, however in practise there is no reason why any number of a different number of pie sections could be used depending upon the size of the turntable the loading requirements and the flexibility requirements of the specific application.

In use, drive motor 32 drives a set of gears within gear box 34 which in turn rotates sprocket 36 which in turn drives drive chain 38 which is trained around the entire outer periphery 132 of turntable 10. Therefore as sprocket 36 rotates, so does turntable 10 as drive chain 38 makes contact with surface elements 20 at outer periphery 132 of turntable 10. Chain tensioning snub sprockets 40 and air pressure devices 42 which preferably are air bags and/or air cylinders maintain a preselected tension onto drive chain 38.

As a load is placed onto any portion of turntable 10, the bottom portion or the flanges of the C-section frame elements 21 make contact with the low friction disc 22 which preferably is a ultra high molecular weight polyethylene pad. Other materials exhibiting similar properties may also be used. The contact between the bottom portion 84 of C-section frame elements 21 and the low friction disc 22 ensures that the turntable 10 is moveable in circular fashion and any axial and/or vertical loading in the axial or vertical direction 122 is supported by the low friction disc 22 and any radial forces in the radial direction 120 are supported by the large diameter precision bearing 24.

It is possible to load turntable 10 unevenly and yet be able to support a substantial weight and be able to rotate turntable 10 freely because bearing surfaces 140 extend evenly over most of the entire bottom 150 of turntable 10.

The free floating arrangement of each pie section 126 adjacent to the other is accomplished by minimzing the number of attachment points between each pie section 126. In the present embodiment one locating pin 130 is used at the narrow end of the pie and two attachment fasteners 136 are used at the broad end of the pie adjacent each pie section 126. This results in each pie section 126 being able to undulate somewhat up and down depending upon the evenness of the floor which is bearing the weight below the low friction disc 22. In this manner the ultimate stiffness required by turntable 10 is much reduced since the load is evenly distributed along each frame member 128 which provide evenly spaced load bearing surfaces 140 through out the entire area of turntable 10.

A person skilled in the art will see the advantages of turntable 10 as compared to the prior art. A very low profile and/or thickness 124 can be accomplished because of the large evenly spaced load bearing surfaces 140 which are provided for by frame 128 of each pie section 126 and also due to the free floating attachment of each pie section to the other via locating pins 130 and fasteners 136. Therefore, the entire weight of turntable 10 is much reduced and the inertia of turntable 10 is also significantly reduced which results in quicker acceleration and deceleration times and also greater accuracy in being able to position the turntable to a given position. In addition the total horsepower requirements are much reduced as compared to the prior art.

Furthermore, construction time and transportation of the turntable to the installation site is greatly simplified since it can be transported in pie sections 126 and easily assembled together on site due to the minimal number of attachment points and reduced excavation requirements.

Sensors, proximity sensors and location sensors are additionally used at various locations and also around the outer periphery 132 of turntable 10 to sense, locate and control the position of turntable 10 at any given point in time. Thereby a feed back system through drive assembly 80 can be used to very accurately control the rotational position of turntable 10.

In comparison to prior art devices which employ air bearings, the present invention has the advantage of being significantly lighter in weight than turntables employing air bearings. Secondly, the present invention does not require large volumes of compressed air in order to make the table function. Due to the fact that the present invention can be easily disassembled into smaller pieces, shipping is much easier and the total weight that is shipped is also significantly reduced. And finally, turntables using air bearings also inflate and deflate air bearings during each cycle of the movement of the turntable thereby increasing the response time of the table to move from one position to the next.

In particular during deceleration of the table, the inertial energy of the rotating table must be dissipated in some manner. With the air bearing supports which offer no friction, all of the energy required to decelerate the table must go through the drive to slow it down. In the present invention the low friction disc 22 suggested provides friction to remove driving power and a quick stop is the result of the presently invented turntable.

By the addition of a complete feedback drive system including servo's, increased stopping accuracy can be obtained by tuning the servo close to the natural stopping of the turntable and thus avoids having to dump excess energy through the drive mechanism of the turntable.

It should be apparent to persons skilled in the arts that various modifications and adaptation of this structure described above are possible without departure from the spirit of the invention the scope of which defined in the appended claim.

I claim:

1. A material handling turntable comprising:
   a) a turntable including a top for receiving a load thereon and a bottom;
   b) a means for driving said turntable in circular motion;
   c) a bearing means for supporting vertical loading on said turntable and sliding against the entire bottom of the turntable;
   d) wherein said turntable assembled from multiple pie sections fastened to each other;
   e) wherein each pie section including a lattice work type frame with the bottom of each frame member defining a bottom load bearing surfaces making sliding contact with said bearing means;
   f) wherein each frame member including U shaped steel beams laid on their side with one leg of the U shaped channel defining the load bearing surfaces at the bottom.

2. A material handling turntable comprising:
   a) a turntable including a top for receiving a load thereon and a bottom;
   b) a means for driving said turntable in circular motion;
   c) a bearing means for supporting vertical loading on said turntable and sliding against the entire bottom of the turntable;
   d) wherein said turntable assembled from multiple pie sections fastened to each other;
   e) wherein each pie section attached to a central hub at one end and to adjacent pie sections at the other broad end;
   f) wherein each pie section is attached with one locating pin to the central hub and with one fastener at each side of the broad end of the pie to each adjacent pie section.

3. A material handling turntable comprising:
   a) a turntable including a top for receiving a load thereon and a bottom;
   b) a means for driving said turntable in circular motion;
   c) a bearing means for supporting vertical loading on said turntable and sliding against the entire bottom of the turntable;
   d) wherein said drive means including a chain trained around the outer periphery of said turntable which is driven by a sprocket to rotate said table.

4. The material handling turntable claimed in claim 3 wherein said chain is trained onto a frictional element located on the outer periphery of said turntable for holding said chain in place and imparting rotational forces.

5. The material handling turntable claimed in claim 1 or 2 wherein said bearing means includes a low friction disc slidably receiving said bottom of said turntable thereon.

6. The material handling turntable claimed in claim 3 wherein said bearing means includes a low friction disc slidably receiving said bottom of said turntable thereon.

7. The material handling turntable claimed in claim 6, wherein said low friction disc comprised of ultra high molecular weight polyethylene pad.

8. The material handling turntable claimed in clam 1, 2, or 3 wherein said top including top plates providing for a substantially level loading surface.

9. The material handling turntable claimed in claim 1, 2, or 3 wherein said drive means including control means for controlling the rotation and positioning accuracy of said turntable.

10. The material handling turntable claimed in claim 1, 2, or 3 wherein said drive means including a feed back drive system with servo motors.

11. The material handling turntable claimed in claim 1, 2, or 3 wherein the turntable including a central precision bearing for supporting any radial forces.

12. The material handling turntable claimed in claim 1 or 2 wherein the number and size of pie sections is selected for ease of transportation on a flatbed trailer.

13. The material handling turntable claimed in claim 3 wherein said turntable assembled from multiple pie sections fastened to each other.

14. The material handling turntable claimed in claim 13 wherein each pie section including a lattice work type frame with the bottom of each frame member defining a bottom load bearing surfaces making sliding contact with said bearing means.

15. The material handling turntable claimed in claim 14 wherein each frame member including U shaped steel beams laid on their side with one leg of the U shaped channel defining the load bearing surfaces at the bottom.

16. The material handling turntable claimed in claim 13 wherein each pie section attached to a central hub at one end and to adjacent pie sections at the other broad end.

17. The material handling turntable claimed in claim 16 wherein each pie section is attached with one locating pin to the central hub and with one fastener at each side of the broad end of the pie to each adjacent pie section.

18. The material handling turntable claimed in claim 13 wherein each pie section fixed in place at three attachment points.

* * * * *